Sept. 5, 1950 C. E. MAYNARD ET AL 2,521,388
MACHINE FOR MAKING ARTICLES, SUCH AS DISPLAY
COVERS FROM THIN PLASTIC SHEET MATERIAL
Filed Sept. 22, 1948 5 Sheets-Sheet 1
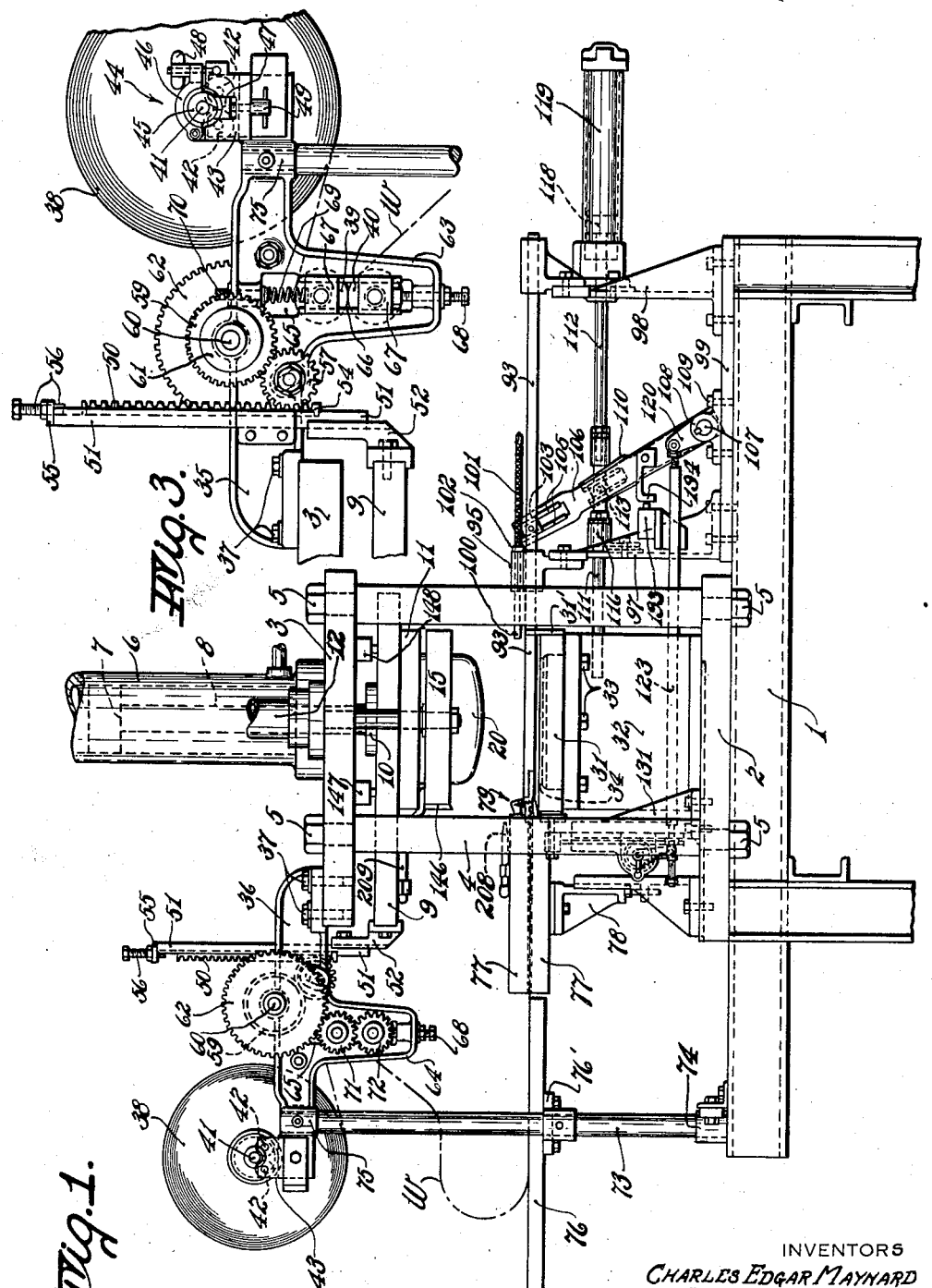
INVENTORS
CHARLES EDGAR MAYNARD
AND LEWIS H. GUSTAFSON
BY
Chapin & Neal
ATTORNEYS

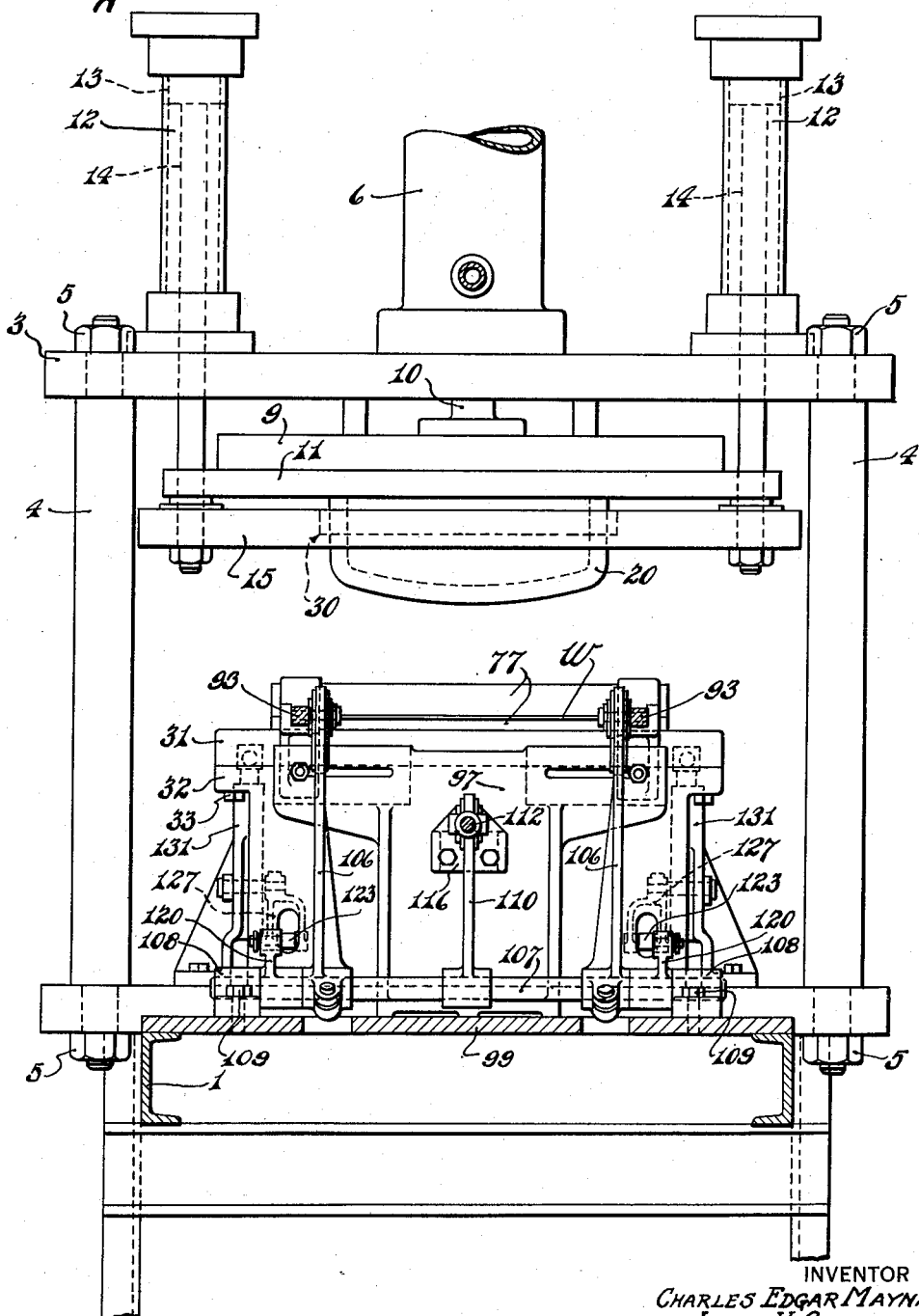

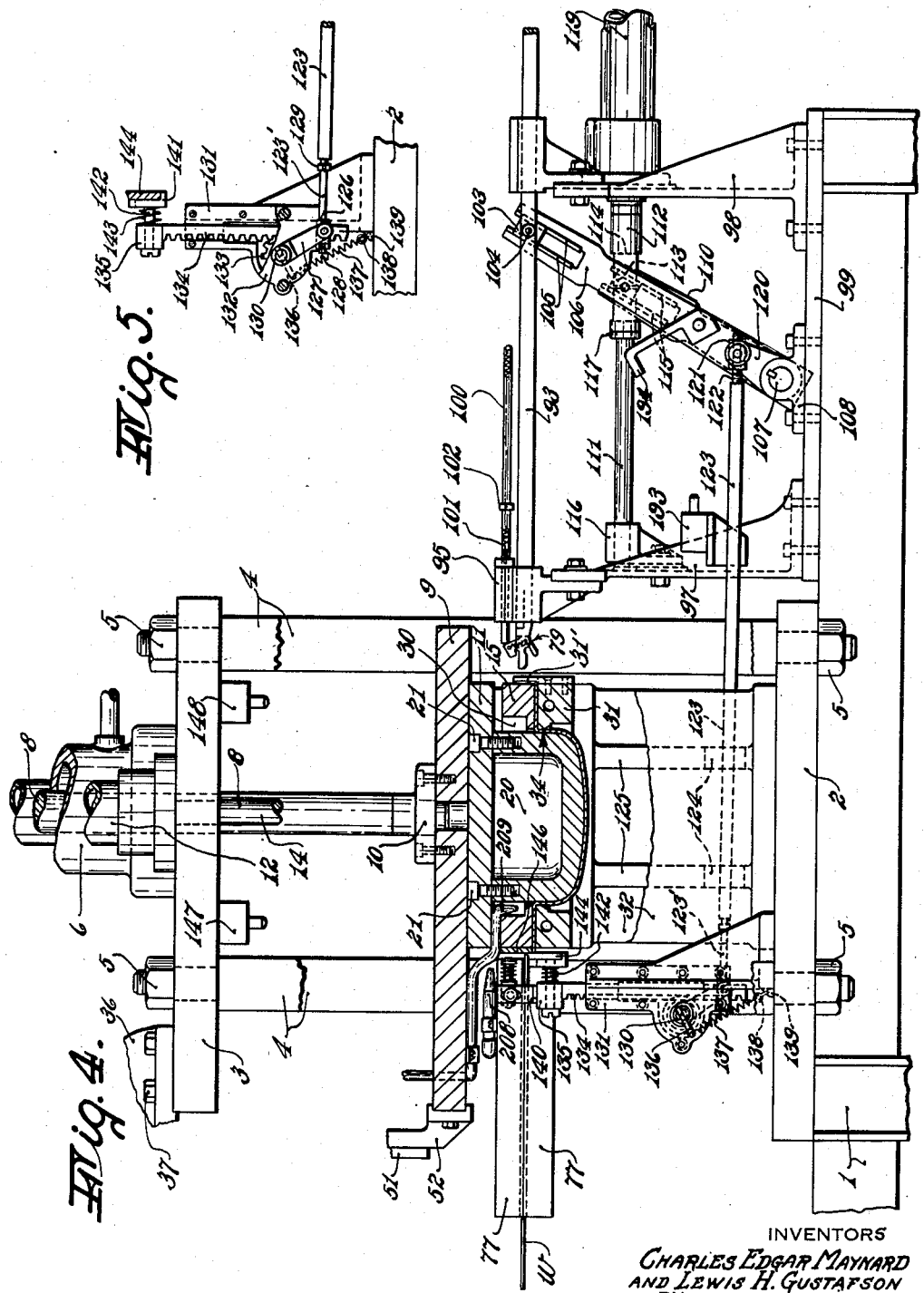

Sept. 5, 1950 C. E. MAYNARD ET AL 2,521,388
MACHINE FOR MAKING ARTICLES, SUCH AS DISPLAY
COVERS FROM THIN PLASTIC SHEET MATERIAL
Filed Sept. 22, 1948 5 Sheets-Sheet 4
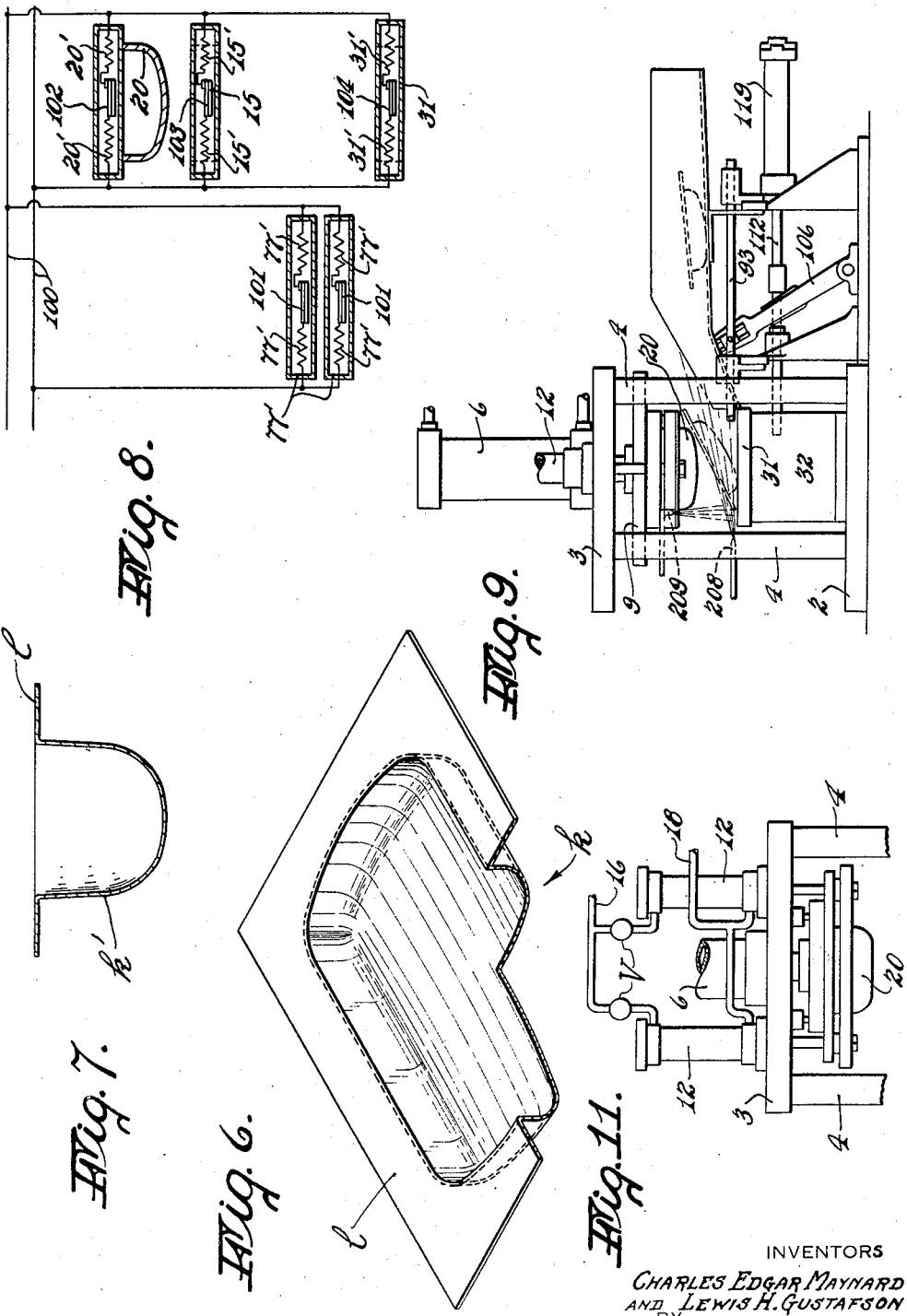
INVENTORS
CHARLES EDGAR MAYNARD
AND LEWIS H. GUSTAFSON
BY Chapin + Neal
ATTORNEYS

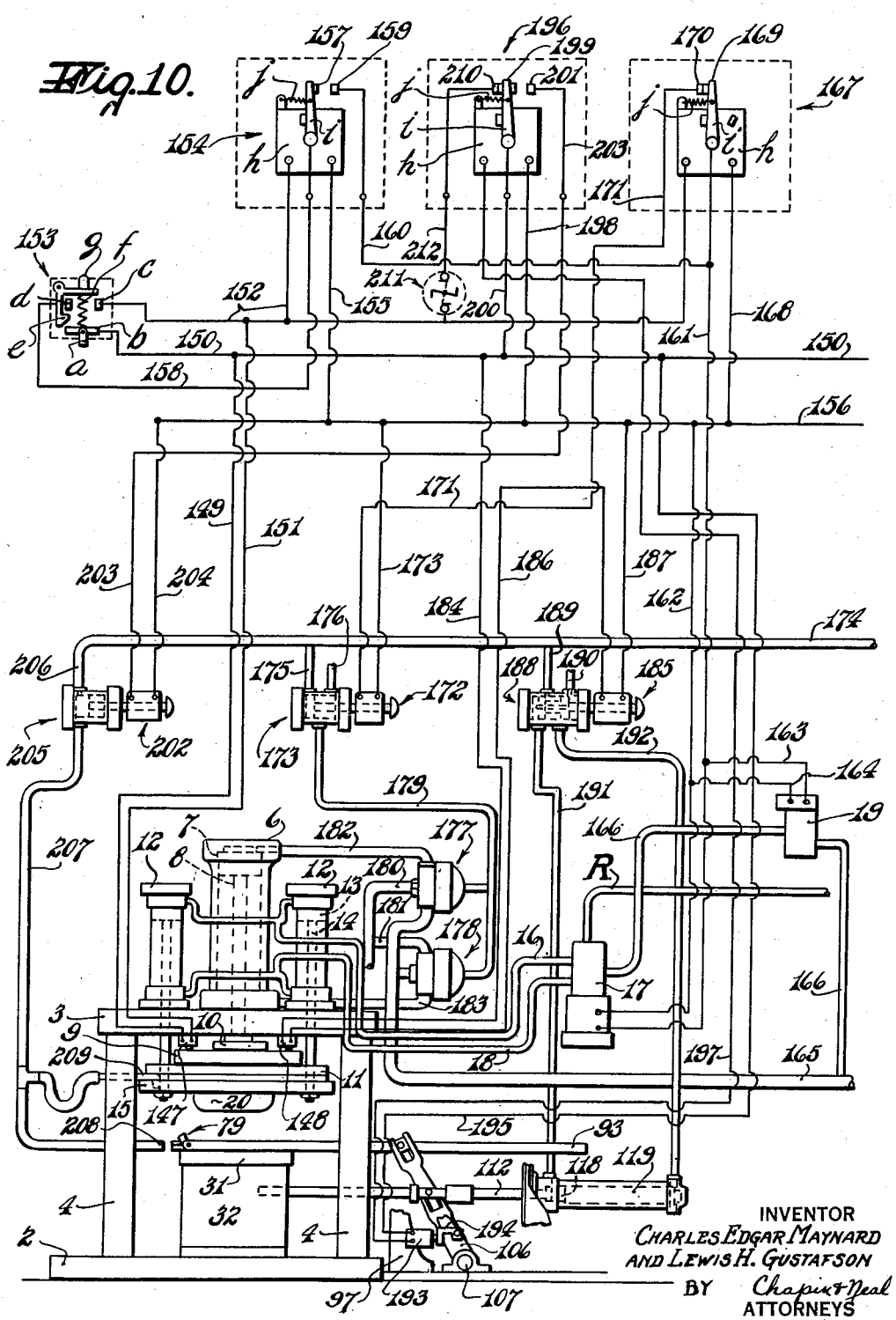

Patented Sept. 5, 1950

2,521,388

UNITED STATES PATENT OFFICE 2,521,388

MACHINE FOR MAKING ARTICLES, SUCH AS DISPLAY COVERS FROM THIN PLASTIC SHEET MATERIAL

Charles Edgar Maynard, Florence, and Lewis H. Gustafson, Northampton, Mass., assignors to Pro-Phy-Lac-Tic Brush Company, Florence, Mass., a corporation of Delaware Application September 22, 1948, Serial No. 50,486

3 Claims. (Cl. 18—19)

This invention relates to improvements in machines to form covers or "hoods" of ornamental plastic material of the type used in making transparent display packages for retail selling of merchandise.

The general purposes of this invention, and structure and mode of operation of the machine described, are the same as those disclosed in our copending application Serial No. 716,014, filed December 13, 1946.

The particular purpose of this invention is to provide a new and improved clamping device that will allow a substantial speeding up of the operation of the machine as well as provide other desirable features which will be fully disclosed with reference to the accompanying drawings and pointed out in the claims.

In the drawings:

Fig. 1 is a side view of the machine;

Fig. 2 is a view looking from the right end of Fig. 1;

Fig. 3 is a view looking from the opposite side of Fig. 1 of parts on that side to distinguish from parts seen in the upper left hand portion of the view in Fig. 1;

Fig. 4 is a view of the machine with some parts broken away and some in section to indicate the relative position of tools during the hood shaping step;

Fig. 5 is a detail view indicating part of the mechanism for cutting off a portion of the sheet plastic material, for the shaping tools of Fig. 4;

Fig. 6 is a formal view of the hood shaped from the flat sheet material, but before trimming;

Fig. 7 is a formal view of a hood much longer than it is wide and of a drawn depth about equal to its width, to indicate a transparent hood made from sheet plastic material of about ten thousandths inch thickness;

Fig. 8 is a diagram to indicate a heating plan for parts of the machine;

Fig. 9 is a somewhat diagrammatic view of the machine indicating the operation of applying air blasts to free the hood from its shaping tool and blow it to one side to a receiving bin before starting another cycle of operation;

Fig. 10 is a diagrammatic view to disclose how the new and improved clamping device is electrically and hydraulically connected for full automatic operation with the machine; and Fig. 11 is a view indicating manually adjustable pressure reducing valves added to the fluid inlet line of the clamping plate cylinders.

Referring to Figs. 1, 2 and 4 of the drawings, a stand 1 bears a frame consisting of a base plate 2 and a top plate 3 supported from the base plate 2 by supporting posts 4 and fixed thereto by nuts 5. A cylinder 6 mounted on the top plate 3 slidably carries a piston 7 to which is fixed a piston rod 8. The rod 8 may slide freely in a bore in the top plate 3 when so urged by the action of fluid pressure on the piston 7, and is attached to a central cylinder plate 9 by means of an adapter 10. A die plate 11 is fixed to plate 9.

Plate 3 also has mounted on it fluid operated cylinders 12 slidably carrying therein pistons 13 with piston rods 14 which slide through bores in plates 3 and 11. These piston rods are attached to clamping plate 15. The cylinders 12 are synchronized in operation with cylinder 6, as will later be fully described, to operate in such a manner that their piston rods 14 will follow the center piston rod 8 on its up stroke and will precede it on its down stroke.

While only two cylinders 12 have been indicated in the drawings, it may be desirable in some cases to have additional ones to more evenly distribute pressure on the clamping plate 15 or to add to another advantageous feature of the two cylinders, i. e. to allow pressures of different magnitude to be exerted on different portions of the clamping plate and permit controlled slippage of each portion of the material under the clamp. Two cylinders will, however, provide this feature to a substantial degree as well as best provide other important features of the present invention, greatly speeding up the operation of the machine, improving the quality of the product and almost entirely eliminating rejects caused from lack of positive clamping.

A convenient arrangement for piping the fluid to the cylinders is shown in Fig. 10. Cylinders 12 are connected together above their pistons 13 by a low pressure conduit 16 which is in turn connected with a solenoid operated four way valve 17. Cylinders 12 are connected at their bases by a high pressure conduit 18 also connected with the four way valve 17. Fluid is supplied to the four way valve 17 from the main supply conduit and through a pressure reducing valve 19. An exhaust line R connects the four way valve 17 with the fluid reservoir (not shown).

The improved clamping means can be more completely described and best understood after the operation and other nomenclature of the machine, now to be described, is known.

A die 20 depends from the plate 11, fixed thereto, as by screws 21, Fig. 4, and is formed to the shape of the hood cavity to be produced, being deeper for the hood of Fig. 7 than for the hood of Fig. 6. The clamping plate 15 lies below the plate 11. The clamping plate 15 has an opening 30 machined therein to permit the die 20 to extend from the plate 11 through the plate 15 when said plate is held in its uppermost position by fluid pressure in cylinders 12 (from high pressure conduit 18) acting against pistons 13, piston rods 14 being attached to the clamping plate 15.

Beneath the center plunger assembly, and positioned in co-operating relationship therewith, a draw plate 31 is borne by supports 32 which are fixed to the base plate 2. The draw plate 31 is fixed to the supports 32 as by bolts 33 and has a machined aperture 34 to receive the die 20 and a heated sheet of plastic material which is drawn to an overlying position on the draw plate 31 by feeding means to be described later.

Extending rearwardly from the top plate 3 and as viewed from the left of Fig. 1, left and right brackets 35 and 36 of web feed mechanism are attached to plate 3 by screws 37 and support a reel of flexible sheet plastic material 38, and feed rolls 39 and 40 (Fig. 3). The reel 38 is borne by shaft 41 which is rotatably mounted on rollers 42 of an anti-friction reel mounting 43. A suitable braking device may be used to frictionally restrain the reel 38 against overfeeding after the feed rolls 39 and 40 have come to rest. Such a device could have many forms, for example that indicated by number 44 in Fig. 3 in which a collar 45 pinned to the shaft 41 is held between a hinged brake shoe 46 and a slidable shoe 47. Pressure is exerted on the collar 45 by the hinged shoe 46 through a wing nut 48 and by the slidable shoe 47 through a thumb screw 49.

The feed rolls 39 and 40, Fig. 3, are driven, through suitable gearing to be described later, by a rack 50 slidable in a slotted rack guide 51 mounted on bracket 52 which is fixed to, and therefore reciprocates with, the central cylinder plate 9. The rack slot in guide 51 extends from a lower stop 54 to a cap 55 secured to the rack guide 51. A screw 56 threaded through the cap 55 provides an adjustable upper stop for the rack 50. As plate 9 descends (from the position shown in Fig. 1) carrying with it the rack guide 51, the rack 50 is held stationary by an idler gear 57 with which it is in mesh until the upper stop screw 56 contacts the upper end of rack 50 and drives it downwardly during the remainder of the stroke of the center cylinder plate 9. Variations in the amount of sheet unrolled may be obtained by using racks of different lengths.

The idler gear 57 is journaled in the left hand bracket 35 and co-operates with a gear 59 to drive a shaft 60 through a unidirectional clutch 61. The shaft 60 is suitably journaled in left hand bracket 35 at one end and right hand bracket 36 at the other end, and projects beyond its right hand bearing to fixedly receive a gear 62. The brackets 35 and 36 have depending projections 63 and 64 which have slots at 65 that contain slides 66 to receive slidable bearing members 67 in which the feed rolls 39 and 40 are mounted. The feed rolls 39 and 40 are positioned by screws 68 and are held in contact by springs 69. Pressure between the rolls 39 and 40 may be varied by means of adjusting screws 70 which bear on springs 69. Rolls 39 and 40 are driven by the gear 62 fixed to shaft 60 through the intermediate gears 71 and 72, Fig. 1. Brackets 35 and 36 are supported on rods 73 which extend from sockets 75 on the brackets.

Sheet plastic material, indicated by the letter w, is unrolled from the reel 38 by the action described above, passing over feed roll 39, Fig. 3, and back between rolls 39 and 40 to fold loosely over a platform 76. The platform 76 is supported by brackets 76' on the rods 73. The web w passes between upper and lower heater plates 77, which are preferably kept at a constant temperature by electrical heating means indicated at 77', Fig. 8, or by the circulation of temperature control fluid through cored or drilled passages, not shown. The heater plates 77 are adjustably mounted on supports 78.

The free end of the web w normally extends beyond the plates 77 sufficiently to provide a grabbing surface for a pair of laterally disposed feed jaws 79, one near the left hand edge of the free end of web w, the other near the right hand edge. The feed jaws 79 at properly timed intervals grasp the free end of the web w which protrudes beyond the inner edges of the heater plates 77 and draw the sheet material over the draw plate 31.

Two feed bars 93 are reciprocated at timed intervals by an air cylinder and piston assembly through drive levers and a countershaft mechanism. A more detailed description of the feed jaw devices and their operation is contained in our copending application Serial No. 716,014.

The feed bars 93 have blocks 103 pivotally fixed to them by pivot pins 104, Fig. 4, said blocks being held in slides 105 machined in the upper end of feed levers 106. The feed levers 106 are keyed to a cross shaft 107 which is mounted in bearings 108 fixed to the auxiliary platform 99 by screws 109, Fig. 1. The cross shaft 107 is driven by a drive lever 110 which extends through a slotted extension 111 of a piston rod 112, Fig. 4. A sliding block 113 is rotatably pinned within a slot 114 in the extension 111 and is guided by slides 115 machined in the drive lever 110. The extension 111 is supported by a guide bracket 116. A stop collar 117 limits the travel of the feed rod 112 by butting the guide bracket 116. A variety of feeds may be obtained by varying the thickness of the stop collar 117. The piston rod 112 is driven by a piston 118, Fig. 1, contained in air cylinder 119.

Mechanism for extending a movable knife blade to a cutting position under the web w adjacent to the draw plate 31, as shown in Figs. 1, 4 and 5, is also driven from cross shaft 107. Keyed to and driven by the shaft 107 are cranks 120 which carry blocks 121 rotatably fixed thereto, Fig. 4. The blocks 121 are adapted to receive the threaded end 122 of a knife actuating rod 123 which extends below the die plate 31 through openings 124 in the supporting webs 125 of the die plate supports 32, as shown in Fig. 4. The rod 123, Figs. 4 and 5, has a turned down portion 123' adapted to slidably receive a sleeve 126 (Fig. 5) pinned to a forked lever 127. Stop collars 128 and 129 fixed to the rod portion 123' limit the sliding motion of the sleeve 126 on slide portion 123'. The forked lever 127 is fixed on a stub shaft 130 journaled on one side in a casing 131 and on the other in cap 132 of the casing 131. The shaft 130 carries a pinion 133 fixed thereto which co-operates with a rack portion 134 of a knife support 135. A pin 136 is fixed to the outer end of stub shaft 130 and serves as a hook on which to anchor one end of a tension spring 137. The other end of spring 137 is hooked to a screw eye 138 fixed to the base of the casing 131 at 139. The action of spring 137 on the shaft 130 and the pinion 133 is such that as the rod 123 is withdrawn from the position shown in Fig. 1 the pull of the spring 137 on the pin 136 rotates the shaft and pinion assembly counterclockwise. The forked lever 127 follows the stop 129 until the upper end of the knife support 135 strikes a stop 140 which is adjustably mounted on the upper heating plate 77. As the rod 123 is further retracted the portion 123' slides through the sleeve 126 until prevented from further travel by the stop 128. Thus the knife support 135 is positively held in its upper position until the action of the rod 123 returning to the position shown in Fig. 1 returns the knife support 135 to its lower position through the action of the lever 127, the pinion 133 and rack 134.

A knife holder 141 is threaded to a stud 142 loosely mounted in the knife support 135. A spring 143 provides flexibility for the knife mounting and serves to maintain it at its extended position. A knife blade 144 is mounted on the knife holder 141 to co-operate with an upper knife blade 146 fixed to the clamping plate 15, Fig. 4, to cut off that portion of web w overlying the draw plate 31 when the clamping plate 15 descends to hold the sheet of plastic material firmly to the draw plate.

Electrical control elements or devices of well known commercial forms are put in the combination of the machine of our invention. They include a start and stop button switch, timers or timing elements, solenoids and limit switches. All have been indicated only diagrammatically to illustrate their function in the control circuit for the automatic power operation of the machine shown.

The pneumatic control devices consist of valves alternately opened and closed by the solenoids when said solenoids are electrically activated by the timing elements or limit switches; and a pair of spring loaded diaphragm valves which alternately introduce and exhaust pressure fluid to the top and bottom ports of the die reciprocating cylinder.

The mechanism and its controls, which have been shown diagrammatically in Fig. 10, will now be described in detail. In the diagram the mechanism and controls have been shown in their rest or cycle-starting position. When the male die assembly, see die 20, is in its uppermost position, limit switches 147 and 148, which are fixed to the top plate 3 of the main frame, are held open by the cylinder plate 9. The limit switch 147 is connected by a lead 149 to one branch 150 of the supply line and by lead 151 to a line 152 which connects the open side of a switch 153 with one terminal of a timing element 154. In operation, when the "start" button a of the switch 153 is pressed and held, the contact b of the switch, which is connected to supply line 150, touches contacts c and d energizing lines 152 and 158, respectively. When pressure to button a is released, contacts b and d are held together by latch e while contacts b and c are pushed apart by spring f, so that, while line 158 remains energized, line 152 does not. Latch e is pivoted to release contact b upon pressure on stop button g.

Timing element or device 154 has been indicated diagrammatically as consisting of an electrical device, such as a small motor, not shown, but in box h, adapted to move a contact arm i against a tension spring j when the motor is operated to bring contacts 157 and 159 together. Incorporated within the device 154, and not shown in the diagram, is timing means adapted for presetting to determine the time interval in which contacts 157 and 159 stay together. The spring j returns the arm to its original position at the end of the predetermined time interval. The parts indicated in device 154 remain in the position shown even though the circuit through lines 152 and 155 remains closed, until this circuit to the device is opened and again closed. This sort of time switch device is well known per se. The reset mechanism contained within the device, and not shown in the diagram, acts to reset the timing device for recycling so that when the control circuit through 152 and 155 is closed a succeeding cycle is started.

When contact 157 of device 154 is against contact 159 the following circuit is established; contact 157 to the contact d of switch 153, contact 159 by line 160 to line 161 leading to solenoid operated four way valve 17, from the latter to line 156 by lead 162, and from contact d through contact b to line 150. This results in energizing solenoid operated four way valve 17.

Solenoid operated pressure reducing valve 19 is also electrically connected to lines 161 and 162 by lines 163 and 164 respectively. When the above described circuit is made the solenoid of valve 19 is energized and operates the valve to reduce the pressure of fluid passing through the valve from the main fluid pressure conduit 165 via conduit 166. The low pressure fluid then passes from valve 19 by conduit 166, through the four way valve 17 into conduit 16 to the top of cylinders 12 exerting fluid pressure on pistons 13 to drive the clamping plate 15 downward into clamping position.

After the clamping plate 15 has started to move downward, the die 20 antecedes it. The following provisions have been made to accomplish this time lag. Line 161 connects to a contact arm i' of a third timing device 167. Line 168 connected with supply line 156 together with line 152 energizes the motor (not shown) of the timing device 167 when line 152 is connected with line 150 through switch 153 and moves the contact arm i' against tension spring j' separating contacts 169 and 170. After a predetermined time interval enough to allow the clamping plate 15 to be moving downward into clamping position, the motor ceases operation and tension spring j' returns contact arm to the position illustrated where contacts 169 and 170 are together. This completes a circuit via line 171 to solenoid 172, from the latter to line 156 by lead 173 and energizes the solenoid.

The solenoid 172 operates an air valve 173 which is connected to air pressure supply line 174 by pipe line 175, and exhausts through pipe line 176. The valve 173 introduces or exhausts air under pressure under the control of the solenoid 172, to a pair of air operated diaphragm valves 177 and 178 through pipe line 179. The diaphragm valves 177 and 178 are connected to an hydraulic pressure source through supply line 165 (Fig. 10) and exhaust through lines 180 and 181. Diaphragm valve 177 is connected to the upper end of cylinder 6 by pipe line 182, while valve 178 is connected to the lower end of cylinder 6 by pipe 183. The valves 177 and 178 are spring loaded and so arranged that when relieved of control air, as is the condition indicated, valve 177 blocks off fluid pressure from line 165 and connects line 182 and the upper end of cylinder 6 to the exhaust line 180, while valve 178 opens the line 183 and the lower end of cylinder 6 to the pressure supply line 165.

These diaphragm valves for this type of function are well known.

Limit switch 148 fixed to top plate 3, and held open by plate 9, as has been described before, is connected to branch 150 of the electrical supply line by a lead 184, and to a solenoid 185 by a lead 186. The electrical circuit to the solenoid 185 is completed by a lead 187 to branch 156 of the supply. The solenoid 185 controls an air valve 188 which is connected to air pressure supply line 174 by pipe line 189 and exhausts through pipe line 190. The valve 188 alternately connects the forward end of feed cylinder 119 to air pressure line 189 or to exhaust line 190 through a line 191, and introduces or exhausts pressure to the rear end of cylinder 119 through a line 192.

A third limit switch 193 supported by bracket 97 and held closed by a lug 194 carried by lever arm 106 on shaft 107 is connected to supply branch 150 by line 195 and to one terminal of a second timing element or device 196 by line 197. The second terminal of timing element 196 is connected to supply line branch 156 by line 198. A contact 199 controlled by timing element 196 is connected to supply line 150 by lead 200 and connects with a contact 201 for a predetermined interval of time when the circuit to the timer 196 is closed. The timing element or device 196 is similar to timing element or device 154 in its general operation with regard to time switch control function, for its circuits. A solenoid 202 is connected to contact 201 by a lead 203 and to supply line 156 by lead 204. The solenoid 202 controls an air valve 205 which is open to air under pressure through line 206. A pipe 207 connects valve 205 with an air nozzle 208 which directs an air jet in a line approximately parallel with the top of die plate 31, and to a nozzle 209 which directs a jet of air approximately parallel to the front side of punch 20. The nozzle 209 is flexibly connected to line 207 to provide for the travel of the die assembly.

The timing device 196 has a third contact 210 which is connected to one terminal of a switch 211 by lead 212. A second terminal of the switch 211 is connected to lead 152. When switch 211 is open the machine will operate for one cycle and stop. When it is closed, as in the dotted line position in Fig. 10, line 152 will be connected to the supply line 150, by line 200, contact 199, contact 210, line 212 and the switch 211. Since the circuit to timing element device 154 is completed by line 152 the effect will be that when switch 211 is closed the timing element device 154 will become energized when the movable arm i of timing element device 196 returns to its rest position.

The operation of the machine will now be described with reference to all drawings and to Fig. 10 in particular. With the machine elements in the position illustrated in Figs. 1, 2 and 4, if the "start" button a of switch 153 is pressed, contact b touches contacts c and d in the switch connecting the power source, through line 150, to lines 152 and 158. Line 152 now connects timing motor h of the timing element 154 to one side 155 of the power supply, and since the motor of box h is permanently connected to the other side 156 of the power supply by line 155 the timing motor is now energized, and moves arm i so that contact 157 strikes contact 159 and a circuit is made through line 158, arm i, contacts 157 and 159 to line 160 and through valve 17 to power line 155. The arm i will remain in this position for a preset interval of time and then return to the position of Fig. 10, as has been explained earlier. The meeting of contacts 157 and 159 energizes the solenoid of pressure reducing valve 19 which reduces the pressure of fluid coming from the main supply conduit 165 and allows the fluid to pass at lower pressure to solenoid operated four way valve 17, the solenoid of which is also energized, so that the valve 17 is open for hydraulic pressure fluid from supply 165 to reach the upper end of cylinders 12 and move the clamping plate 15 downward toward clamping position. At this point, motor h of timing device 167, which was energized by the closing of switch 153, slightly before contacts 157 and 159 of timer 154 came together to move contacts 170 and 169 apart, "times out" and allows spring j to bring contacts 170 and 169 of timer 167 back together. This energizes solenoid 172, valve 173 is shifted to its intake position and control air under pressure flows through line 179 to diaphragm valves 177 and 178 reversing these valves so that hydraulic pressure fluid from supply 165 now flows through valve 177 and pipe 182 to the upper end of cylinder 6, and the valve 178 connected with the lower end of the cylinder 6 by pipe 183 is open to the exhaust line 181. The piston 7 starts downward carrying with it the die assembly. Almost immediately after the die assembly starts its downward travel (approximately ½ inch of travel), the actuating buttons of the limit switches 147 and 148 are released closing both switches. Limit switch 147 connects line 150 and line 152 so that it is no longer necessary to hold switch contacts c and d together and the start button a may be released. The other side of switch 153, that is, that to which line 158 is connected, is locked in contact and may only be released by pressing the stop button g of the switch.

When the die assembly starts downwardly the rack 50, Figs. 1, 2 and 3, drives the feed rolls 39 and 40 through the clutch 61 and gearing previously described, which action strips from the reel 38 a predetermined unit quantity of sheet plastic material. The rack 50 is freely slidable in the guide 51 an amount limited by the position of adjustable stop 56 and the distance the rack 50 is driven by guide 51 after the rack 50 is engaged by the stop 56 determines the amount of sheet material unrolled regardless of the length of the piston stroke. The unrolled sheet plastic material remains loosely folded over platform 76 and extends between the heater plates 77, Fig. 1.

Returning to Fig. 10, the limit switch 148 which with limit switch 147 is closed when the die assembly starts to descend energizes the solenoid 185 which reverses valve 188 and introduces air under pressure to the front end of feed cylinder 119 through pipe 189 and 191 and connects the rear end to exhaust through pipe 193 and 190. The piston 118 is driven to the opposite end of cylinder 119, as in Fig. 4, carrying with it the rod 112 and the slotted connection 111. The lever 110 rotates the shaft 107 and levers 106. This results in the retraction of the pair of feed jaws 79 by sliding blocks 103 and feed bars 93, Fig. 4, and since the free end of the sheet plastic material is protruding through the heater plates 77 and is firmly clamped by feed jaws 79, the sheet material is drawn through the heater plates over the draw plate 31. The free end of web w is released when the pivoted jaw of each of the feed jaws 79 strikes the stop rods 100 (Fig. 4) and is pivoted to its release position. The stop rods 100 are slidably held in their normally extended position in guides 95 by the springs 101 and collars 102, but are pushed part way through guides 95 by the feed jaws 79 when the feed jaws are in their retracted position, as in Fig. 4. The edge of the sheet plastic material hits stop fingers 31', Fig. 4, only one of which are shown, which prevents the sheet from adhering to the toothed jaws and being pulled beyond the draw plate 31.

Rotation of the shaft 107 results also in rotation of the crank 120 which retracts the lower knife actuating rod 123 from the position shown in Fig. 1 to the position of Fig. 4. The forked lever 127, Fig. 5, rotates under the influence of spring 131 and drives the knife support 135, through the pinion 133 and rack 135, to its cutting position, as shown in Figs. 4 and 5. The collar 128 provides a lock against counter-rotation of the pinion when the cutting action takes place. That is, when the die assembly approaches the lower limit of its downward stroke the clamping plate 15, preceding the die slightly descends to clamp the web to the draw plate 31, and the upper knife blade 146 (Fig. 4), carried by the clamping plate 15, co-operates with the knife blade 144 to shear off that portion of the web positioned on top of the draw plate 31. The clamping plate 15 operates to clamp the web to the draw plate 31 before the forcing action of the die takes place, as has been described.

The limit switch 193, see Figs. 1, 4 and 10, which is actuated by bracket 194 carried by lever 106, is opened when this lever is rotated by the shaft 107, as in Fig. 4. This deenergizes the timing element 196 which automatically resets and remains in readiness for its next signal from the switch 193.

With the sheet plastic material now cut off and clamped to the draw plate 31 by the clamping plate 15, the die assembly completes its downward stroke. The die enters the draw aperture pushing along with it the plastic material suspended over said aperture until part of the die assembly bottoms against the draw plate and is held there by pressure against the piston 7. The sheet material has now been stretched tightly from the edge of the draw plate opening over the male forming die. After a preset interval of time the timing element 154 (Fig. 10) breaks the circuit between contact 159 and 157, thus deenergizing the solenoids of fluid pressure reducing valve 19 and four way valve 17 as well as the solenoid 172. Deenergizing the first two named solenoids causes the valve 19 to cease reducing fluid pressure and hydraulic fluid from the supply line 165 to flow to the four way valve under high line pressure, and additionally causes the four way valve to be moved so as to admit the high pressure fluid to line 18 leading to the base of clamping plate cylinders 12. When the four way valve moves into this position, low pressure line 16 to the top of cylinders 12 is connected to the exhaust line R leading to the reservoir (not shown). This forces fluid into the base of the cylinders 16, moves pistons 13 upward, and starts lifting the clamping plate, fluid being forced from the top of cylinders 12 through line 16 and the four way valve 17 to the exhaust line R.

Deenergizing solenoid 172 causes the die plate assembly to start upward with the clamping plate, the air valve 173 returning to the position shown in Fig. 10 and the diaphragm valves reversing to raise piston 7 and the die plate assembly with it. At the top of its upward stroke the cylinder plate 9 contacts the limit switches 147 and 148, opening the circuit to these switches. Opening switch 147 opens the circuit between power line 150 and 152, deenergizing timing element 154 which now resets automatically. Since the timing element 154 has already broken the circuit to solenoid 172 at the bottom of the die stroke there is now no change in the solenoid 172, the valve 173, or the diaphragm valves 177 and 178. The piston 7 travels to the top of its stroke and is held there by hydraulic pressure.

Opening limit switch 148 opens the circuit to the solenoid valve 185, the air valve 188 reverses, pressure is reversed in the feed cylinder 119 which causes the piston 118 to reverse its position in the cylinder and causes the feed jaws 79 to advance and grasp the web protruding from the heating plates 77, the position shown in Fig. 1. This action also results in a withdrawal of the lower knife holder 135 (Fig. 4) to its lower position through the retraction of the rod 123. The feed jaws 79 and the knife holder 135 are held in this position by air pressure against the piston 118 in the cylinder 119 (Fig. 1).

When the above described action takes place the bracket 194 carried by lever 106 strikes the button of the limit switch 193 closing the circuit in this switch (Fig. 1). This action energizes timing element 196 (Fig. 10) which closes the circuit through contacts 199 and 201 for a preset interval of time. This energizes solenoid 202, reversing valve 205, and air under pressure flows through nozzles 208 and 209 in the form of a high velocity air blast, as is shown somewhat diagrammatically in Fig. 9. The air from nozzle 209 serves to blow the formed plastic hood from the die 20 downwardly toward the draw plate 31. At this point the jet from nozzle 208 serves to eject the article from the press up a discharge chute to a receptacle or conveying means.

The duration of this ejecting action is controlled by timing element 196 and need only be for a very short time—two seconds, approximately. When the present time interval elapses the circuit is broken between contacts 199 and 201, solenoid 202 is deenergized and spring pressure returns the valve 205 to its closed position (Fig. 10). The circuit of the timing element 196 is still closed, but inoperative, since its circuit must be broken, through limit switch 193, before it will reset or automatically recycle to operate. Contact 199 meets contact 210, but if the switch 211 is open, as might be the case when setting up the machine before starting on an automatic run, there is no flow of energy between the line 212 and 152, and the machine and its controls remain in the condition shown in Figs. 1 and 10. This might be termed the one cycle operation. In order to start a following cycle the "start" button of switch 153 must be pressed to energize line 152 and the timing element 154. However, in normal running operation the switch 211 would be closed, connecting line 152 with line 210 so that, as soon as the timing element 196 returns its contact arm i to rest position and its live contact 199 strikes contact 210, a circuit is immediately closed to timing element 154, energizing it and automatically starting the working cycle as has been explained above.

Referring to Fig. 8, there is a power circuit 100 from which heating current is turned on and off in circuit 77' controlled by a thermostat 101 sensitive to the temperature of oven parts 77 to hold the oven temperature substantially constant. There is another heating circuit 20' turned on and off by a thermostat 102 sensitive to the temperature of male die part 20 to hold the temperature of this part substantially constant. There is another heating circuit 15' turned on and off by a thermostat 103 sensitive to the temperature of clamp plate 15 to hold this plate temperature substantially constant. There is another heating circuit 31' turned on and off by a thermostat 104 sensitive to the temperature of draw plate 31 to hold this plate temperature substantially constant. Under the heating plan indicated or an equivalent one the temperature of the sheet plastic material is made one that will draw best when it is drawn by the machine. For example the oven 77 may give the sheet the right drawing temperature and the other machine parts thereafter contacting the sheet heated just enough to avoid heat loss until the sheet is drawn. Or the heat can be more gradually added to the sheet it being important that the sheet being drawn is carefully guarded against a marring chill and be of the right drawing softness when it is drawn.

The plan of Fig. 8 is diagrammatic only. It is sometimes useful, particularly in working plastic material, to use fluids in cored passages of tool parts to control the temperature of the plastic for working it. There is the advantage that any tendency of overheating can be corrected by mixing hot and cold fluid to get the right tool temperature speedily. The electrical heating plan lends itself better to a simple diagram sufficient for the purpose of this disclosure.

There are some particularly important things to do in providing for practicing the invention and especially important when the depth of drawing begins to or substantially exceeds one half the width of the article being made, as is indicated in the article of Fig. 7 when the depth $k'$ and width $l$ are about equal. Referring to Fig. 4, the two openings one in each of the two clamping plates 15 and 31 through which the former or male die 20 passes, should be most carefully dimensioned with respect to the thickness of the sheet plastic material, i. e. the work piece, shown in the relation of the parts in Fig. 4. Of course the male die part will be deeper when the article of Fig. 7 is made. The dimensions should be made in all dies and especially the deep die forms, to provide a very small clearance between the sheet plastic material and the opening in the female clamping plate 31. For example, in forming sheet material to make successive hoods, the thickness will vary a little. Suppose it is between .001 and .002 of an inch. Then the openings in plates 15 and 31 should be made as close as possible to be sure to provide for such variation but otherwise omit all clearance between the material and plate 31, as seen in Fig. 4. One fault in prior efforts to draw hoods of satisfactory finished appearance, especially the deep hoods of Fig. 7, is in providing for too great clearance between the draw plate and die. Of course there are practical difficulties in getting extremely close dimensions. The important thing is to consider the requirements of providing for variations in sheet plastic thickness. It is available commercially with variations of a very few thousandths of an inch. When care is taken to provide the space corresponding to that seen in Fig. 4 as filled with material of the article being made, between part 20 and plate 31, to accommodate variations of a very few thousandths of an inch in the sheet material and as far as possible avoid additional clearance the proper practice will be followed. As a practical matter the degree of clearance can be kept within a range of a very few thousandths of an inch and this appears to be a condition for the most successful work in any hood and one essential for making deep hoods. It is in contrast to very much larger clearances heretofore provided in the proposals and attempts to draw fine appearing hoods whose depth is anywhere near or beyond one half their width in relative dimensions.

Another important provision in operating the method by machine work to get an economical commercial operation is this. Referring to the drawings, the flat plastic sheet is initially heated in the oven. It then moves to lie on the draw plate. This plate is heated and kept at a substantially constant temperature. The sheet is engaged between the hold down plate 15 and draw plate 31. This plate 31 is also heated and kept at a substantially constant temperature. The sheet is then engaged by the forming die 20. This die is also heated and kept at a substantially constant temperature. Thus the sheet properly heated to that softness suitable for drawing is not chilled. It is neither overheated nor underheated but its drawing softness effectively provided for and guarded until the sheet is drawn to finished hood form. This is a critical thing because if the material is anywhere underheated in the area drawn there is a strain which frequently tears or wrinkles it. If the material is anywhere overheated in the area drawn there is a high liability and frequent occurrence for the sheet to be given "pock-marked" areas or blemishes in the finished article making it unsatisfactory for its intended use.

Another important provision is to maintain a definite and uniform pressure at the edge margin of the material, i. e. the margin of material engaged between plates 15 and 31, as the material is drawn through the drawing plate opening. When the material starts to be formed over the male die, it must be slightly stretched and at the same time it must be allowed to slip from underneath the hold down plate just the right amount and this can be provided for only by properly guarded uniform pressure on the edge of the material. The fluid pressure system for controlling the clamping plate herein disclosed gives the operator of the machine a chance to adjust the clamping pressure to any degree desired and once adjusted assures all pieces will be uniformly held. It may be desirable when drawing shapes of odd form to have more more material slip under one side of the clamping plate than under another. This feature can be easily provided in the system disclosed by the simple addition of manually controlled pressure control valves V (Fig. 11) in each of the two branches of line 16 which supplies fluid to the top of cylinders 12. This will allow the operator to vary the pressure applied to the material, should this be desired, by applying slight pressure on one side or corner only and not the other side or corners.

The new and useful way of applying pressure for clamping the material will give the machine great flexibility in operation and substantially speed up the machine.

Having fully disclosed our invention, we claim:
1. A machine to make hoods from sheet plastic material comprising in combination, a horizontally arranged draw plate having an opening with an edge corresponding to a base line of a hood, a roll support adapted to hold a roll of plastic sheet material, a web support for the material, power driven means adapted to intermittently draw portions of material off its roll and put it on the web support in loose web condition, an open ended oven in position for the web to pass through toward said draw plate, web feeding means including power driving means to feed the forward end of the web intermittently to draw one part into the oven and another heated part from the oven across the draw plate to cover its opening, web cutting means to cut a blank of predetermined length from the heated part of the web, a clamping plate and fluid operated cylinders and pistons, said pistons each connected to and bearing on different portions of the clamping plate to apply predetermined clamping pressures on different parts of the plate to press the margin of the heated cut web part around the draw plate opening so as to permit controlled slipping of each portion of the heated cut web part, power tool reciprocating means mounted above the draw plate opening, a drawing tool, in the shape of a core corresponding to a hood cavity, such tool carried by said reciprocating means, the aforesaid elements being operable under power for repeated cycles of operation, to draw a heated sheet portion from the oven, cut a blank of predetermined length from said heated portion, clamp it over the draw plate opening, move the drawing tool against the plastic material and draw the latter to hood form while the material at the edges of the opening are held flat by the clamping means.

2. A machine to make hoods from sheet plastic material comprising in combination, a horizontally arranged draw plate having an opening with an edge corresponding to a base line of a hood, a roll support adapted to hold a roll of plastic sheet material, a web support for the material, power driven means adapted to intermittently draw portions of material off its roll and put it on the web support in loose web condition, an open ended oven in position for the web to pass through toward said draw plate, web feeding means including power driving means to feed the forward end of the web intermittently to draw one part into the oven and another heated part from the oven across the draw plate to cover its opening, web cutting means to shear off the portion of web covering the draw plate opening, a clamping plate and fluid operated mechanism, to apply a predetermined clamping pressure on said plate to press the margin of the heated cut part around the draw plate opening, power tool reciprocating means mounted above the draw plate opening, a drawing tool, in the shape of a core corresponding to a hood cavity, such tool carried by said reciprocating means, the aforesaid elements being operable under power for repeated cycles of operation, to draw a heated sheet portion from the oven, cut it off from the continuous web, clamp it over the draw plate opening, move the drawing tool against the plastic material and draw the latter to hood form while the material at the edges of the opening is held in flat pressed condition by the clamping means, air blast means adapted to blow aside the cut-off portion clear of the drawing tool after the latter has operated and hold down clamping means has been released.

3. A machine to make hoods from sheet plastic material comprising in combination, a horizontally arranged draw plate having an opening with an edge corresponding to a base line of a hood, a roll support adapted to hold a roll of plastic sheet material, a web support for the material, power driven means adapted to intermittently draw portions of material off its roll and put it on the web support in loose web condition, an open ended oven in position for the web to pass through toward said draw plate, web feeding means including power driving means to feed the forward end of the web intermittently to draw one part into the oven and another heated part from the oven across the draw plate to cover its opening, web cutting means to sever the heated part when said part is in position across the draw plate opening, a clamping plate and a plurality of fluid operated cylinders and pistons, said pistons being connected to the clamping plate in spaced relation around its periphery to move the plate into and out of clamping position and to exert predetermined clamping pressures on different portions of the plate to press the margin of the heated cut part of the web around the draw plate opening when the plate is in clamping position, power tool reciprocating means mounted above the draw plate opening, a drawing tool, in the shape of a core corresponding to a hood cavity such tool carried by said reciprocating means, the aforesaid elements being operable under power for repeated cycles of operation, to draw a heated sheet portion from the oven, sever it from the continuous web, clamp this blank over the draw plate opening, move the drawing tool against the plastic material and draw the latter to hood form while the material at the edges of the opening is held flat by the clamping means to permit controlled slipping, air blast means to blow the cut-off drawn portion to one side of the drawing tool after the latter operates and such cut off portion is unclamped, and power operated timing means for controlling the sequence in the power operation of said elements whereby the machine is adapted for fully automatic operation to make hoods one after another, except in relation to replacing exhausted spools of the sheet plastic material.

CHARLES EDGAR MAYNARD.
LEWIS H. GUSTAFSON.

REFERENCES CITED

The following references are of record in the file of this patent:

UNITED STATES PATENTS

| Number | Name | Date |
| --- | --- | --- |
| 1,181,964 | Bohlman | May 2, 1916 |
| 2,229,613 | Strauch | Jan. 21, 1941 |
| 2,255,116 | Helmstaedter | Sept. 9, 1941 |
| 2,418,874 | Gary, Jr. | Apr. 15, 1947 |
| 2,442,338 | Borkland | June 1, 1948 |